United States Patent [19]

Abraham et al.

[11] Patent Number: 5,332,631
[45] Date of Patent: Jul. 26, 1994

[54] SOLID POLYMER ELECTROLYTES TO ALLEVIATE VOLTAGE DELAY OF LITHIIUM CELLS

[75] Inventors: Kuzhikalail M. Abraham, Needham; Mohamed Alamgir, Dedham, both of Mass.; David M. Pasquariello, Pawtucket, R.I.

[73] Assignee: E.I.C. Corp., Norwood, Mass.

[21] Appl. No.: 689,085

[22] Filed: Apr. 19, 1991

Related U.S. Application Data

[63] Continuation-in-part of Ser. No. 604,834, Oct. 24, 1990, abandoned.

[51] Int. Cl.$^5$ ............................................. H01M 6/14
[52] U.S. Cl. ..................................... 429/48; 429/101; 429/192; 429/194; 429/246
[58] Field of Search .................. 429/48, 49, 194, 196, 429/246, 192, 101

[56] References Cited

U.S. PATENT DOCUMENTS

| | | | |
|---|---|---|---|
| 3,993,501 | 11/1976 | Kalnoki-kis | 429/48 |
| 4,020,240 | 4/1977 | Schlaikjer | 429/50 |
| 4,170,693 | 10/1979 | Catanzarite | 429/48 |
| 4,296,185 | 10/1981 | Catangarite | 429/48 |
| 4,608,753 | 9/1986 | Fleischer | 429/48 X |
| 4,684,583 | 8/1987 | Klinedinst et al. | 429/48 |
| 4,707,422 | 11/1987 | de Neufville et al. | 429/48 |

*Primary Examiner*—Anthony Skapars
*Attorney, Agent, or Firm*—Christopher Blank; James Sullivan

[57] ABSTRACT

An electrochemical cell, comprising a lithium anode, a cathode, and a liquid electrolyte of lithium tetrachloroaluminate dissolved in thionyl chloride, has a coating of a Li ion conductive solid polymer electrolyte on the anode. An example of the solid polymer electrolyte is a Li salt complex of poly[bis(methoxyethoxyethoxy)phosphazene].

9 Claims, 4 Drawing Sheets

SOLID POLYMER ELECTROLYTES TO ALLEVIATE VOLTAGE DELAY OF LITHIIUM CELLS

This invention was made with Government support under Contract No. N60921-88-C-0102 awarded by the United States Naval Surface Warfare Center. The Government has certain rights in this invention.

This application is a continuation-in-part of application Ser. No. 604,834 filed Oct. 24, 1990, now abandoned.

FIELD OF THE INVENTION

This invention relates to the use of Li ion conductive solid polymer electrolytes as coatings on the Li anodes of Li electrochemical cells to alleviate their voltage delay.

BACKGROUND OF THE INVENTION

This invention pertains to electrochemical cells and in particular to lithium cells comprised of a lithium metal anode(s) coated with Li ion conductive solid polymer electrolyte, a porous carbon cathode current collector, and a liquid electrolyte solution of lithium tetrachloroaluminate dissolved in an oxyhalide solvent. An example of this type of electrochemical cell is the Lithium/Thionyl Chloride ($Li/SOCl_2$) or the Lithium/Sulfuryl Chloride ($Li/SO_2Cl_2$) cell. The $Li/SOCl_2$ cell has been known as a power source for consumer applications such as pacemakers, electronic devices, and watches, and for many military applications such as missiles and torpedoes. The attractiveness of this electrochemical cell results from its high cell voltage, usually between 3 V and 3.6 V depending upon the power drain rate, and its high energy density.

In $Li/SOCl_2$ and $Li/SO_2Cl_2$ cells the highly oxidizing sulfur oxychloride liquid electrolyte is in direct contact with the Li anode. Despite this, the cells are stable because when Li comes in contact with $SOCl_2$ or $SO_2Cl_2$ it reacts and forms a compact, protective film of LiCl on its surface. This LiCl protective film functions as a solid electrolyte interphase allowing the transport of Li ions across it while preventing the direct transfer of electrons from Li to $SOCl_2$. This special feature of the lithium-sulfur oxychloride cells allows the fabrication of stable electrochemical cells. An undesirable feature of these cells, however, is that, when they are stored, the LiCl film increases in thickness. The film growth rate is a function of the storage temperature, with the rate increasing at higher temperatures. For example, the LiCl film attains a thickness of 2,000–10,000 Å when a $Li/SOCl_2$ cell is stored at 70° C. for two weeks. The LiCl film is a poor Li ion conductor with a conductivity of less than $10^{-9}$ (ohm-cm)$^{-1}$. In a freshly prepared cell in which the anode film is thin, the voltage loss due to the resistivity of the film when the cell is placed under load (i.e., discharged) is small. On the other hand, when an identical cell is discharged after a certain period of storage, there is a significant delay in its voltage before it rises to an acceptable value. This comes from the large resistive voltage drop in the thicker LiCl film on the anode of the stored cell. Thus, Li-sulfuroxychloride cells are characterized by a voltage delay which is defined as the time it takes for the cell potential to attain a value of 2 volts after it has been placed under load. The voltage delay time varies from seconds to hours, depending on the type of oxychloride cell, the storage period, storage temperature, and the load value. Under certain conditions, such as storage at 70° C. for two weeks or more followed by discharge at high current densities $\geq 10$ mA/cm$^2$, the voltage of the cell may never recover to 2 volts. In general, the voltage delay problem is a serious deficiency of lithium-sulfur oxychloride cells.

SUMMARY OF THE INVENTION

We have discovered that the voltage delay of the $Li/SOCl_2$ cell can be mitigated by coating the Li anode with a Li ion conductive solid polymer electrolyte prior to the incorporation of the anode into the cell. A preferred solid polymer electrolyte is a Li salt (e.g., $LiAlCl_4LiBF_4$, $LiClO_4$, etc.) complex of poly[bis-(methoxyethoxyethoxy)phosphazene], abbreviated MEEP. These complexes, [MEEP.$(LiX)_n$] as shown in Table 1, have ionic conductivity considerably higher than that of LiCl. As a result, they allow high rate transport of Li ions through them while preventing direct reaction between the Li anode and $SOCl_2$. In this way the solid polymer electrolyte retards the formation of a thick LiCl film. Consequently, $Li/SOCl_2$ cells containing Li anodes coated with MEEP-$(LiX)_n$ electrolytes exhibit little or no voltage delay when discharged after storage.

TABLE 1

Figure 1A:
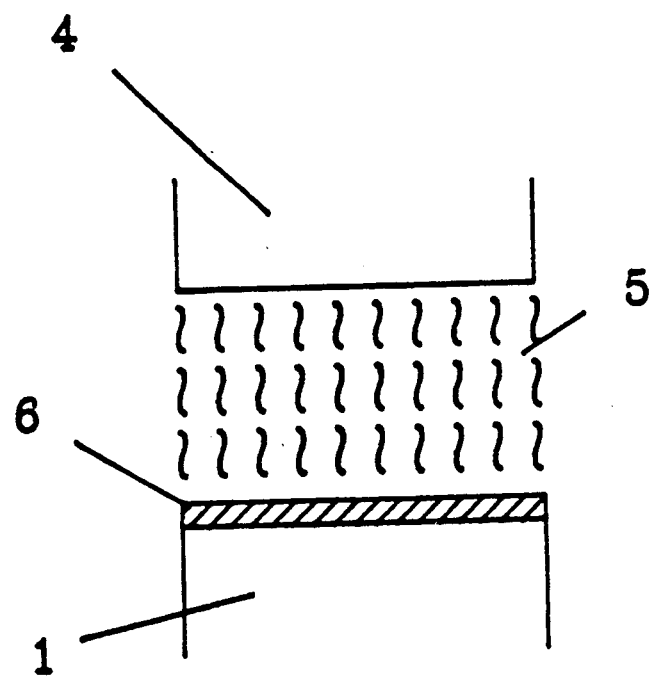
FIG. 1A is a schematic of an electrochemical cell comprised of a Li anode (1) and cathode (4) in $SOCl_2$/$LiAlCl_4$ solution (5) showing the voltage delay-causing LiCl film at the Li surface. The LiCl film consists of a compact, protective section (2), and a more porous secondary section (3) whose thickness increases with the length of storage.
Figure 1B:
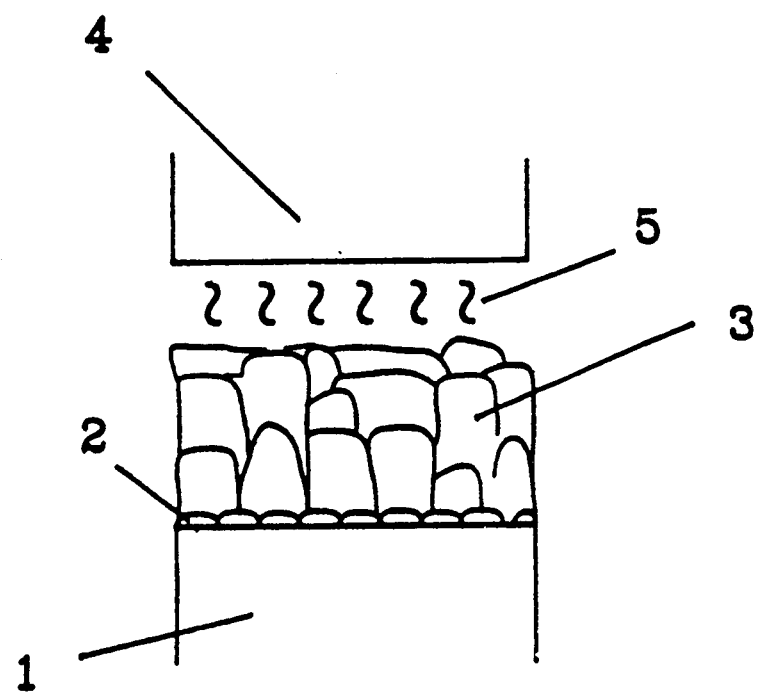
FIG. 1B shows a Li anode (1) coated with a MEEP.$(LiX)_n$ solid polymer electrolyte (6) on which the LiCl film does not grow.

| Conductivities of MEEP Solid Polymer Electrolytes at 25° C. | |
| --- | --- |
| Solid Polymer Electrolyte | Conductivity (ohm-cm)$^{-1}$ |
| MEEP · $(LiClO_4)_{0.25}$ | $8.3 \times 10^{-5}$ |
| MEEP · $(LiCF_3SO_3)_{0.25}$ | $4.8 \times 10^{-5}$ |
| MEEP · $(LiBF_4)_{0.25}$ | $7.7 \times 10^{-5}$ |
| MEEP · $(LiAlCl_4)_{0.25}$ | $6.6 \times 10^{-6}$ |
| MEEP · $[LiN(CF_3SO)_2]_{0.25}$ | $6.5 \times 10^{-5}$ |
| 70 wt % MEEP/30 wt % PEO-$(LiBF_4)_{0.13}$ | $7 \times 10^{-6}$ |

DETAILED DESCRIPTION

The electrochemical cell of the present invention consists of an alkali metal anode, preferably Li, and a metal screen cathode current collector, having deposited on it an inert but electrically conducting material such as carbon black or graphite. The alkali metal anode has deposited on it a coating of the solid polymer electrolyte. The anode and the cathode current collector are separated from internal electrical short-circuit by an insulating but electrolyte absorbing material such as a fiberglass mat. The liquid electrolyte typically is a solution of lithium tetrachloroaluminate dissolved in thionyl chloride. During discharge, the inorganic halide in the liquid electrolyte is reduced on the carbon at the cathode with simultaneous oxidation of the alkali metal anode, and transport of both the Li ions through the solid polymer electrolyte coating into the liquid electrolyte and the electrons through the external circuit resulting in electricity. The solid polymer electrolyte coating is advantageous in controlling the voltage delay and preserving the capacity of the cell.

A solid polymer electrolyte is defined as a polymer which has the ability to complex with and transport lithium ions in such a way as to result in an ionically conductive solid phase. The polymer complexes with the Li ion of Li salts through its electron donating heteroatom such as oxygen. To be useful in this invention the solid polymer electrolyte coating should be relatively insoluble in the liquid electrolyte.

The structural formula for the polymer poly[bis-(methoxyethoxyethoxy) phosphazene], called MEEP, is shown below.

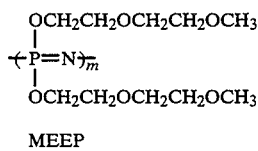

MEEP

MEEP is a member of a family of polymers represented by the general formula $[-(R)_2P=N-]_m$ where R is an electron donor group, such as alkoxy or alkylamino, capable of complexing with Li salts. A prominent example of R is the methoxyethoxyethoxy group in MEEP. Those skilled in the art are able to choose a variety of R groups in order to optimize the conductivity and/or the stability of the polymer complex. The m in the above structural formula stands for the number of monomer groups in the MEEP polymer. The value of m is usually greater than one hundred and seventy seven. This comes from the fact that the molecular weight of the MEEP polymer used in forming the complex usually is higher than fifty thousand, and since the MEEP monomer unit has a molecular weight of two hundred and eighty three, the value of m is greater than one hundred and seventy seven.

An object of the invention is to provide a Li anode coating comprised of a polymer electrolyte having high conductivity for Li ions at room temperature. High conductivity here implies a value of greater than $10^{-6}$ $ohm^{-1}$-$cm^{-1}$, as shown in Table 1 for several electrolytes derived from MEEP. Conventional polymer electrolytes based on Li salt complexes of poly(ethylene oxide), PEO, and poly(propylene oxide), PPO, have only low conductivities of about $10^{-9}$ $ohm^{-1}$-$cm^{-1}$ at room temperature which are too low to alleviate voltage delay since these polymer electrolyte coatings themselves, due to their high resistivity, will cause significant voltage loss when the cell is placed on a discharge load. However, polymer electrolytes derived from PEO and PPO may be mixed with MEEP-based polymer electrolytes to obtain mixed polymer electrolytes exhibiting high conductivities equal to or greater than $10^{-6}$ $ohm^{-1}$-$cm^{-1}$ at room temperature.

It is also an object of this invention to provide a polymer electrolyte anode coating of a suitable thickness. The importance of a polymer electrolyte coating of a specific thickness can be understood from calculations of the magnitude of the voltage drop which will occur through the polymer electrolyte coating when the cell is discharged through a load. This voltage loss will be proportional to the resistivity of the polymer electrolyte coating. The following calculation is illustrative.

The resistive voltage loss ($\Delta E$) in the polymer electrolyte coating is given by equation [1].

$$\Delta E = iR \quad [1]$$

In equation [1], i is the current and R is the resistance of the film. R is given by equation [2].

$$R = \rho \cdot \frac{l}{A} \quad [2]$$

In equation [2], $\rho$ is the specific resistivity (inverse of specific conductivity) of the polymer electrolyte, and l and A are the thickness and area, respectively, of the coating. When a $Li/SOCl_2$ cell having an open circuit voltage of 3.65 V is discharged at a current density of 10 $mA/cm^2$, the iR drop that can be tolerated in the coating is about 0.35 V. This is because, with an iR drop of this magnitude, the load voltage of the cell will still be greater than 3 V. The coating thickness required for an iR drop of 0.35 V when the discharge current density is 10 $mA/cm^2$ and the conductivity of the coating is $5 \times 10^{-5}$ $ohm^{-1}$-$cm^{-1}$, is determined by substituting equation [2] into equation [1] and replacing the various functions with actual values. That is, $$\Delta E = \frac{i}{A} \rho l = \frac{10^{-2}}{1} \cdot \frac{10^5}{5} \cdot l = 0.35 \text{ V}$$

$$l = \frac{5 \cdot 35 \cdot 10^{-2}}{10^{-2} \cdot 10^5} = 175 \cdot 10^{-5} \text{ cm}$$

$$= 17.5 \text{ }\mu m$$

These calculations reveal that the thickness of the polymer electrolyte coating should be maintained at 17.5 $\mu m$ or less in order to maintain an iR drop in the coating of less than or equal to 0.35 V, at a discharge current density of 10 $mA/cm^2$. The actual thickness of the polymer electrolyte anode coating that can be used in practical cells will depend upon the conductivity of the polymer electrolyte, the magnitude of the discharge load and the discharge temperature. Equations [1] and [2] above can be used to readily calculate the electrolyte coating thickness desirable in batteries for a given application.

A polymer electrolyte coating having a thickness of 10-20 $\mu m$ can be applied on the anode in a number of ways including spraying onto the Li anode a solution of the polymer electrolyte in a suitable solvent, or dipping the Li anode in a solution of the polymer electrolyte in a suitable solvent followed by drying the solvent off to leave a coating. We have found this latter dip-coating technique to be especially suitable for achieving a uniform and compact coating. These latter two properties are particularly desirable for the coating to be fully effective in preventing the growth of the voltage delay-causing reaction product film. In the dip-coating process, the thickness of the coating is readily determined by the concentration of the polymer electrolyte solution. Also, by varying the concentration of the polymer electrolyte solution and the number of coats applied, the thickness of the coating can be tailored to a particular value. The examples given below further illustrate the coating procedure and the concentrations of the polymer electrolyte solutions we used in laying down a coating of about 20 μm thickness.

The salt used to form the polymer electrolyte may be any Li salt such as $LiClO_4$, $LiAsF_6$, $LiBF_4$, $LiCF_3SO_3$, $LiAlCl_4$, LiI, LiBr, $LiNO_3$, $LiGaCl_4$, $LiPF_6$, $LiN(CF_3SO_2)_2$, and others. The ratio of the MEEP polymer to Li salt is chosen in such a way as to obtain a polymer electrolyte of the highest conductivity. This ratio usually is one mole of MEEP monomer to 0.25 mole of the Li salt. However, polymer electrolytes having polymer to Li salt ratios different from these may be used with some sacrifice in conductivity.

The following examples further illustrate the advantages of this invention and enable those skilled in the art to practice the invention.

EXAMPLE 1

The Compatibility of MEEP Films with Li

Fresh Li foil was coated with a solution of MEEP dissolved in tetrahydrofuran (THF). To accomplish this, a solution of MEEP in THF was first prepared by dissolving 0.5 g of MEEP in 10 ml of THF, and the Li anode, measuring 8 mm×40 mm×0.51 mm, was dipped into it. The anode was then taken out of the solution, and after removal of the THF through evaporation at room temperature, the surface of the Li foil was inspected by Scanning Electron Microscopy (SEM) and Diffuse Reflectance Fourier Transform Infrared Spectroscopy (DRFTIR). The IR spectrum of the Li surface film was identical to that of neat MEEP indicating that a coating of MEEP was laid in the process and that there was little evidence of reaction between the MEEP coating and the Li surface. The SEM micrograph indicated the coating to be pinhole-free.

EXAMPLE 2

The Stability of MEEP Films on Li Surfaces

Fresh Li foil was coated as in Example 1. The coated Li was stored under vacuum in a glass tube for three months at room temperature, with no evidence of reaction between the MEEP and the Li surface. A similarly prepared sample was stored for an additional two months at 70° C., again with little evidence of reaction of the MEEP film on the Li surface.

EXAMPLE 3

The Stability of MEEP Films on Li in the Presence of $SOCl_2$

Fresh Li foil was coated as in Example 1. The coated Li strip was stored in neat $SOCl_2$ for four weeks at room temperature. At the end of the storage period the surface of the Li strip was examined by means of DRFTIR and SEM as in Example 1. The results indicated that MEEP remained on the surface.

EXAMPLE 4

The Stability of MEEP Films on Li in the Presence of $SOCl_2$/1.0M $LiAlCl_4$ Fresh Li foil was coated as in Example 1. The coated Li strip was stored in $SOCl_2$/1.0M $LiAlCl_4$ for four weeks at room temperature. DRFTIR yielded absorption bands in the fingerprint region closely resembling those of neat MEEP. SEM photographs showed that the coating cracked during storage and crystalline reaction products (probably LiCl) were randomly distributed on top of the coating. However, these crystalline products were present in much lower levels than those found typically on the surfaces of uncoated Li strips under the same storage conditions.

EXAMPLE 5

Performance of Li/$SOCl_2$ Cells with Uncoated Anodes after Storage for Two Weeks at Room Temperature or at 70° C.

An electrochemical cell was fabricated with Li metal anodes and cathodes consisting of expanded nickel screens having deposited on them carbon black with Teflon as a bonding agent. The cell contained 2 anodes and 1 cathode, arranged in the fashion Li/C/Li to form an electrode package. The cathode measured 1.8 cm×1.8 cm, so that, counting both sides, each had an area of 6.4 $cm^2$. The cathode thickness was 0.13 cm. The Li anodes, each measuring 1.9 cm×2.5 cm×0.05 cm, were connected together to form the negative electrical terminal of the cell. Similarly, the cathode was connected to a Ni wire forming the positive lead of the cell. The cathode was separated from the anode by a fiberglass mat. The electrode package was placed in a rectangular glass vial. Pieces of Teflon sheet stock were placed between the wall of the glass vial and the electrode stack to ensure adequate compression of the stack. Cells prepared in this manner were filled with 3 ml of $SOCl_2$/1.0M $LiAlCl_4$, placed in a glass storage chamber sealed with a Viton ® O-ring, and stored at room temperature or at 70° C. for two weeks. Identical cells were also stored for two weeks at room temperature. At the end of this storage period the cells were discharged at room temperature using a current of 64 mA (10 mA/$cm^2$). The cells stored at room temperature exhibited voltage delays of ~0.25 seconds, average load voltages of 3 V, and an average capacity of ~0.5 Ah/g of Carbon. Identical cells stored at 70° C. were driven to negative potentials upon discharge, and needed up to two minutes for the voltage to recover to ≧2 V. The capacity of the cells stored at 70° C. was severely diminished, being 0.20 Ah/g-Carbon.

EXAMPLE 6

Performance of Li/$SOCl_2$ Cells with MEEP-$(LiBF_4)_{0.25}$ Coated Anodes after Storage for Two Weeks at Room Temperature A solid polymer electrolyte was made by forming a 4:1 mole ratio complex of MEEP and $LiBF_4$, respectively. Specifically, a mixture consisting of 1.0 g of MEEP and 0.08 g of $LiBF_4$ were dissolved in 10 ml of tetrahydrofuran, and the resulting solution was used to coat the anodes of cells identical to those described in Example 5. Coating was accomplished by dipping the anodes in the solutions, removing them, and evaporating the THF at room temperature. Li/$SOCl_2$ cells with anodes treated in this fashion were stored for two weeks at room temperature. When discharged at 10 mA/$cm^2$ at room temperature they did not exhibit a voltage delay. The load voltage on the average was 3 V, and the capacity obtained was equivalent to ~0.5 Ah/g-Carbon. The fact that cells coated with the polymer electrolytes could be discharged at high rates with the same load voltages as uncoated anodes supports the high $Li^+$ conductivity of this polymer electrolyte coating.

EXAMPLE 7

Performance of Li/SOCl$_2$ Cells with MEEP-(LiAlCl$_4$)$_{0.25}$ Coated Anodes after Storage for Two Weeks at Room Temperature A solid polymer electrolyte was made by forming a 4:1 mole ratio complex of MEEP and LiAlCl$_4$, respectively. Specifically, a mixture consisting of 1.0 g of MEEP and 0.16 g of LiAlCl$_4$ was dissolved in tetrahydrofuran, and the resulting solution was used to coat the anodes of a cell identical to that described in Example 5. Cells prepared as in Example 5 above were stored for two weeks at room temperature before discharged at 10 mA/cm$^2$ at room temperature. These cells exhibited a minimal voltage delay of <0.1 second before the potential reached the minimum voltage of 1.8 V. The average discharge voltage was 3 V and the discharge capacity was 0.6 Ah/g-Carbon. The fact that cells coated with the polymer electrolytes could be discharged at high rates with the same load voltages as uncoated anodes supports the high Li$^+$ conductivity of this polymer electrolyte coating.

EXAMPLE 8

Performance of Li/SOCl$_2$ Cells with MEEP-(LiAlCl$_4$)$_{0.25}$ Coated Anodes after Storage for Two Weeks at 70° C.

Figure 2:
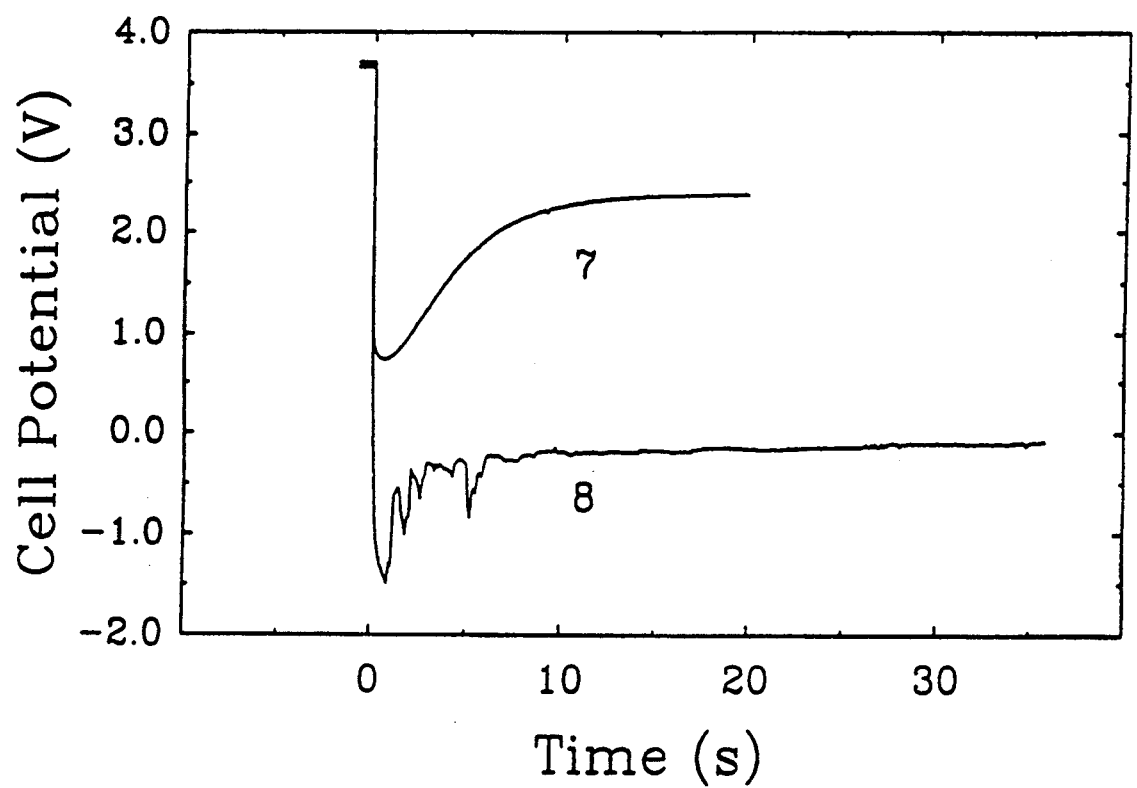
FIG. 2 shows the initial voltage delay comparison of $Li/SOCl_2$ cells stored at 70° C. for two weeks in which the anode was either uncoated (8) or coated (7) with a MEEP-$(LiAlCl_4)_{0.25}$ electrolyte.
Figure 3:
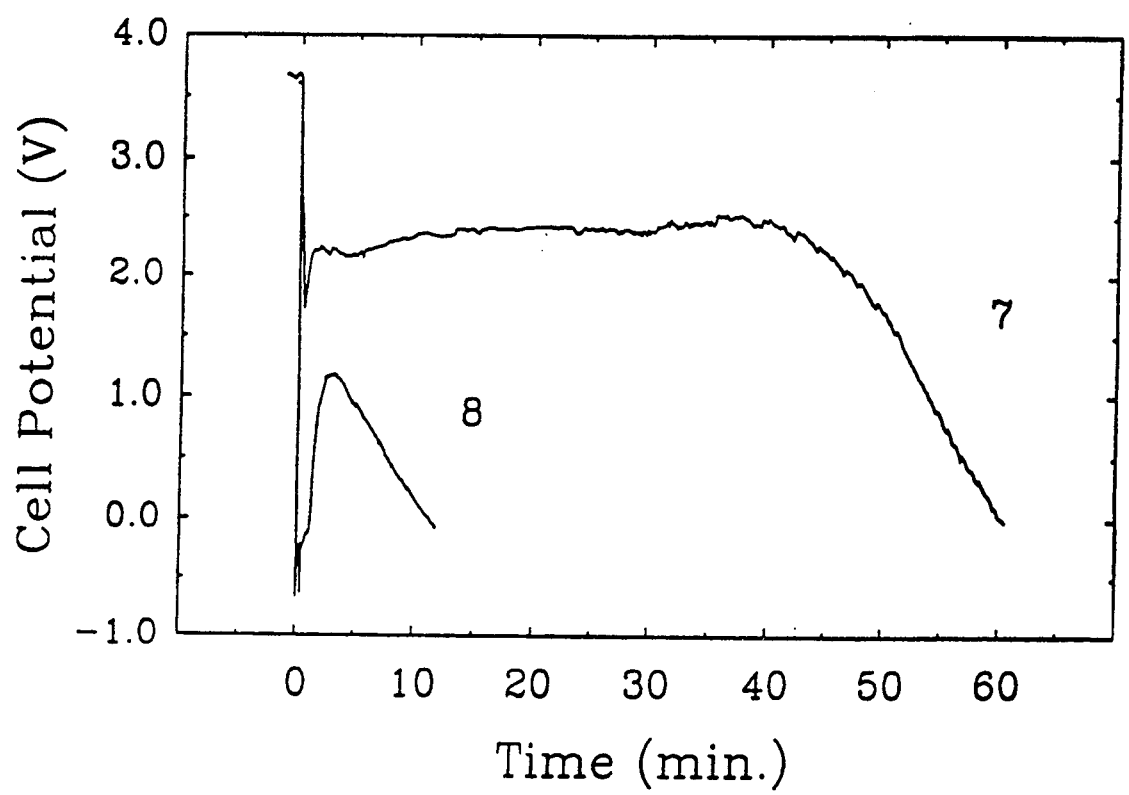
FIG. 3 shows the complete discharge of these two cells. The discharge current of the cells used to generate the plots in FIGS. 2 and 3 was 64 mA (10 mA/cm$^2$).

Cells were prepared as in Example 5 utilizing anodes treated as in Example 7. After storage for two weeks at 70° C., the cells were discharged at 10 mA/cm$^2$. FIGS. 2 and 3 show the distinct advantage of Li/SOCl$_2$ cells having anodes treated with a solid polymer electrolyte as compared to Li/SOCl$_2$ cells with untreated Li anodes. At the end of storage the cells were pulsed at 64 mA (10 mA/cm$^2$) to obtain voltage delay information (FIG. 2). Subsequently the cells were discharged at the same current, 64 mA (FIG. 3), until the voltage decreased to 0.0 V.

FIG. 2 shows that a Li/SOCl$_2$ cell with untreated anodes has an initial voltage of −1.5 V, and a partial recovery to only −0.1 V after 35 seconds. By comparison, the cell in this figure with anodes coated with the MEEP.LiAlCl$_4$ polymer electrolyte shows a minimum voltage of 0.7 V and a voltage delay of just 6.6 seconds after which the cell voltage is greater than 2 V.

FIG. 3, which gives complete discharge curves, shows that the cell with uncoated anodes takes over 1 minute to achieve a positive voltage, 2 minutes to reach a maximum voltage of 1.1 V, and delivers only ~10 mAh (0.09 Ah/(g-Carbon)) of capacity to a 0.0 V limit. In contrast, the voltage minimum of the cell with coated anodes was 1.7 V, and the cell recovered to greater than 2.0 V after ~0.7 second. This cell delivered a total capacity of ~63 mAh (0.59 Ah/(g-Carbon)), with ~48 mAh obtained at voltages ≧2.0 V. FIGS. 2 and 3 show clearly that Li/SOCl$_2$ cells with anodes coated with a solid polymer electrolyte film have significantly shorter voltage delays, significantly higher load voltages, and significantly increased capacity retention after storage at elevated temperatures.

EXAMPLE 9

Performance of Li/SOCl$_2$ Cells with MEEP-(LiCF$_3$SO$_3$)$_{0.25}$ Coated Anodes After Storage for Two Weeks at 70° C.

A Li/SOCl$_2$ cell was constructed after its Li anodes were coated with MEEP-(LiCF$_3$SO$_3$)$_{0.25}$. The coating was carried out as in Example 7. The cell was stored for two weeks at 70° C. and then discharged at 10 mA/cm$^2$ at room temperature. Its voltage delay was only 0.8 second after which its potential recovered to greater than 2.5 V. The full discharge capacity of the cell was 0.80 Ah/g-carbon to a 0.0 V limit. This, when compared to the data for the cell having uncoated anodes in FIG. 2, exemplifies the superior performance of cells with polymer electrolyte coated anodes.

EXAMPLE 10

Performance of Li/SOCl$_2$ Cells with MEEP-[LiN(CF$_3$SO$_2$)$_2$]$_{0.25}$ Coated Anodes After Storage for Two Weeks at 70° C.

A Li/SOCl$_2$ cell was constructed after its Li anodes were coated with MEEP-[LiN(CF$_3$SO$_2$)$_2$]$_{0.25}$. The coating was performed as in Example 7. The cell was stored for two weeks at 70° C. and then discharged at 10 mA/cm$^2$ at room temperature. Its voltage delay was only 1.6 seconds after which the cell potential recovered to a value greater than 2.5 V. The full discharge capacity of this cell was 0.71 Ah/g-carbon to a 0.0 V limit, which, when compared to the data for the cell having uncoated anodes in FIG. 2, exemplifies the superior performance of cells with polymer electrolyte coated anodes.

EXAMPLE 11

Performance of Li/SOCl$_2$ Cells with MEEP/PEO-(LiAlCl$_4$)$_{0.13}$ Coated Anodes After Storage for Two Weeks at 70° C.

A Li/SOCl$_2$ cell was constructed after its Li anodes were coated with a mixed polymer electrolyte comprised of 70 weight-percent (w/o) MEEP and 30 weight-percent (w/o) poly(ethylene oxide), PEO, complexed with LiAlCl$_4$. This polymer electrolyte composition was 70 w/o MEEP/30 w/o PEO-(LiAlCl$_4$)$_{0.13}$. In this, the ratio of MEEP monomer to Li salt molecular ratio is 6:1.

The coating was performed as follows: Poly(ethylene oxide) weighing 0.1 g was dissolved in 5 ml of THF at about 70° C. This solution was mixed with 0.25 g MEEP and 0.026 g LiAlCl$_4$ and stirred until a homogeneous solution was obtained. The solution was cooled to room temperature. The Li anode was coated with the mixed polymer electrolyte by dipping it in the THF solution, and removing the THF by evaporation at room temperature.

The cell was stored for two weeks at 70° C. and then discharged at 10 mA/cm$^2$ at room temperature. The voltage delay was only 1.9 seconds after which the cell voltage recovered to a value greater than 2.5 V. The full discharge capacity of the cell was 0.44 Ah/g-carbon to a 0.0 V limit. This, when compared to the data for the cell having uncoated anodes in FIG. 2, exemplifies the superior performance of cells utilizing polymer electrolyte coated anodes. This example also illustrates the general nature of the usefulness of polymer coating on the Li anode to alleviate the voltage delay and preserve the capacity of Li/SOCl$_2$ cells pursuant to storage at elevated temperatures.

EXAMPLE 12

Performance of Li/SOCl$_2$ Cells with MEEP/PEO-(LiCF$_3$SO$_3$)$_{0.25}$ Coated Anodes After Storage for Two Weeks at 70° C.

A Li/SOCl$_2$ cell was constructed after its Li anodes were coated with a mixed polymer electrolyte of the composition 70 w/o MEEP/30 w/o PEO-(LiCF$_3$SO$_3$)$_{0.13}$. The coating was performed as in Example 11.

The cell was stored for two weeks at 70° C. and then discharged at 10 mA/cm$^2$ at room temperature. The voltage delay was only 3.8 seconds after which the cell voltage recovered to a value greater than 2.5 V. The full discharge capacity of the cell was 0.84 Ah/g-carbon to a 0.0 V limit. This, when compared to the data for the cell having uncoated anodes in FIG. 2, exemplifies the superior performance of cells utilizing polymer electrolyte coated anodes. This example also illustrates the general nature of the usefulness of polymer coating on the Li anode to alleviate the voltage delay and preserve the capacity of Li/SOCl$_2$ cells pursuant to storage at elevated temperatures.

We claim:

1. An electrochemical cell comprised of a cathode, a liquid electrolyte comprising one or more lithium salts dissolved in sulfur oxyhalides, and a lithium anode coated with a solid polymer electrolyte comprised of a lithium salt complex of a polymer which contains an electron donating heteroatom such as oxygen through which the polymer complexes with the lithium salt, wherein said polymer is a polyphosphazene of the formula

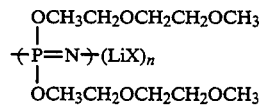

where LiX is a lithium salt, m is the number of repeating polyphosphasphazene monomer in the polymer electrolyte.

2. The electrochemical cell of claim 1 wherein said lithium salt complex with the polyphosphazene polymer is comprised of one or more salts selected from the group LiAlCl$_4$, LiAsF$_6$, LiBF$_4$, LiBr, LiCF$_3$SO$_3$, LiClO$_4$, LiGaCl$_4$, LiI, LiNO$_3$, LiN(CF$_3$SO$_2$)$_2$, and LiPF$_6$.

3. The electrochemical cell of claim 1 where n=0.25.

4. The electrochemical cell of claim 2 wherein said liquid electrolyte is comprised of LiAlCl$_4$ in thionyl chloride.

5. An electrochemical cell comprised of a cathode, a liquid electrolyte comprising one or more lithium salts dissolved in sulfur oxyhalides, and a lithium anode coated with a solid polymer electrolyte comprised of a lithium salt complex of a polymer which contains an electron donating heteroatom such as oxygen through which the polymer complexes with the lithium salt, wherein said polymer is a polymer mixture of a polyphosphazene and poly(ethylene oxide), PEO.

6. The electrochemical cell of claim 5 wherein said Li salt complex with the polymer mixture is comprised of one or more salts selected from the group LiAlCl$_4$, LiAsF$_6$, LiBF$_4$, LiBr, LiCF$_3$SO$_3$, LiClO$_4$, LiGaCl$_4$, LiI, LiNO$_3$, LiN(CF$_3$SO$_2$)$_2$ and LiPF$_6$.

7. The electrochemical cell of claim 6 in which said polyphosphazene is poly[bis-methoxyethoxyethoxy)-phosphazene], MEEP.

8. The electrochemical cell of claim 6 wherein said liquid electrolyte is comprised of LiAlCl$_4$ in thionyl chloride.

9. The electrochemical cell of claim 7 in which the ratio of MEEP to PEO is about 70 weight-percent to 30 weight-percent and the molecular ratio of the Li salt to MEEP monomer unit is about 1 to 6.

* * * * *